(12) United States Patent
Zhang

(10) Patent No.: US 8,531,156 B2
(45) Date of Patent: *Sep. 10, 2013

(54) BATTERY CHARGER WITH RETRACTABLE CONTACTS

(75) Inventor: Shuai Zhang, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 460 days.

This patent is subject to a terminal disclaimer.

(21) Appl. No.: 12/868,146

(22) Filed: Aug. 25, 2010

(65) Prior Publication Data

US 2011/0241606 A1 Oct. 6, 2011

(30) Foreign Application Priority Data

Apr. 1, 2010 (CN) .......................... 2010 1 0137845

(51) Int. Cl.
*H01M 10/46* (2006.01)
(52) U.S. Cl.
USPC ........................................ 320/114

(58) Field of Classification Search
USPC ........ 320/107, 111, 112, 114, 115; D13/103, D13/107
See application file for complete search history.

(56) References Cited

U.S. PATENT DOCUMENTS

| 7,187,156 | B2 * | 3/2007 | Nakasho et al. | 320/107 |
| 7,750,598 | B2 * | 7/2010 | Hoffman et al. | 320/107 |
| 7,999,508 | B2 * | 8/2011 | Yang | 320/114 |
| 2011/0241605 | A1 * | 10/2011 | Zhang | 320/107 |

* cited by examiner

*Primary Examiner* — Edward Tso
(74) *Attorney, Agent, or Firm* — Altis Law Group, Inc.

(57) ABSTRACT

A battery charger includes a housing, at least two contacts, a transmission mechanism and a driving member. The housing defines a sliding slot and at least two guide holes. The at least two contacts are received in the housing and are operable to protrude out of the housing via the at least two guide holes. The transmission mechanism is received in the housing and is used for driving the at least two contacts to protrude out of the housing. The driving member is received in the housing and partially extends out of the housing after passing through the sliding slot. The driving member is coupled to the transmission mechanism, and is capable of sliding in the sliding slot to activate the transmission mechanism to drive the at least two contacts to protrude out of the housing.

19 Claims, 9 Drawing Sheets

US 8,531,156 B2

BATTERY CHARGER WITH RETRACTABLE CONTACTS

BACKGROUND

1. Technical Field

The present disclosure relates to battery chargers, and particularly to a battery charger having retractable contacts.

2. Description of Related Art

A battery charger often includes spring contacts external to its housing. To charge a battery, the charger can be connected to a power source, and then the battery is placed in the charger. The external contacts of the charger or the battery may be short-circuited when conductive objects make contact with them. Subsequently this may damage the charger or the battery.

Therefore, there is room for improvement in the art.

BRIEF DESCRIPTION OF THE DRAWINGS

The components of the drawings are not necessarily drawn to scale, the emphasis instead being placed upon clearly illustrating the principles of the embodiment of a battery charger with retractable contacts. Moreover, in the drawings, like reference numerals designate corresponding parts throughout several views.

DETAILED DESCRIPTION

Embodiments of the present disclosure will now be described in detail with reference to the drawings.

Figure 1:
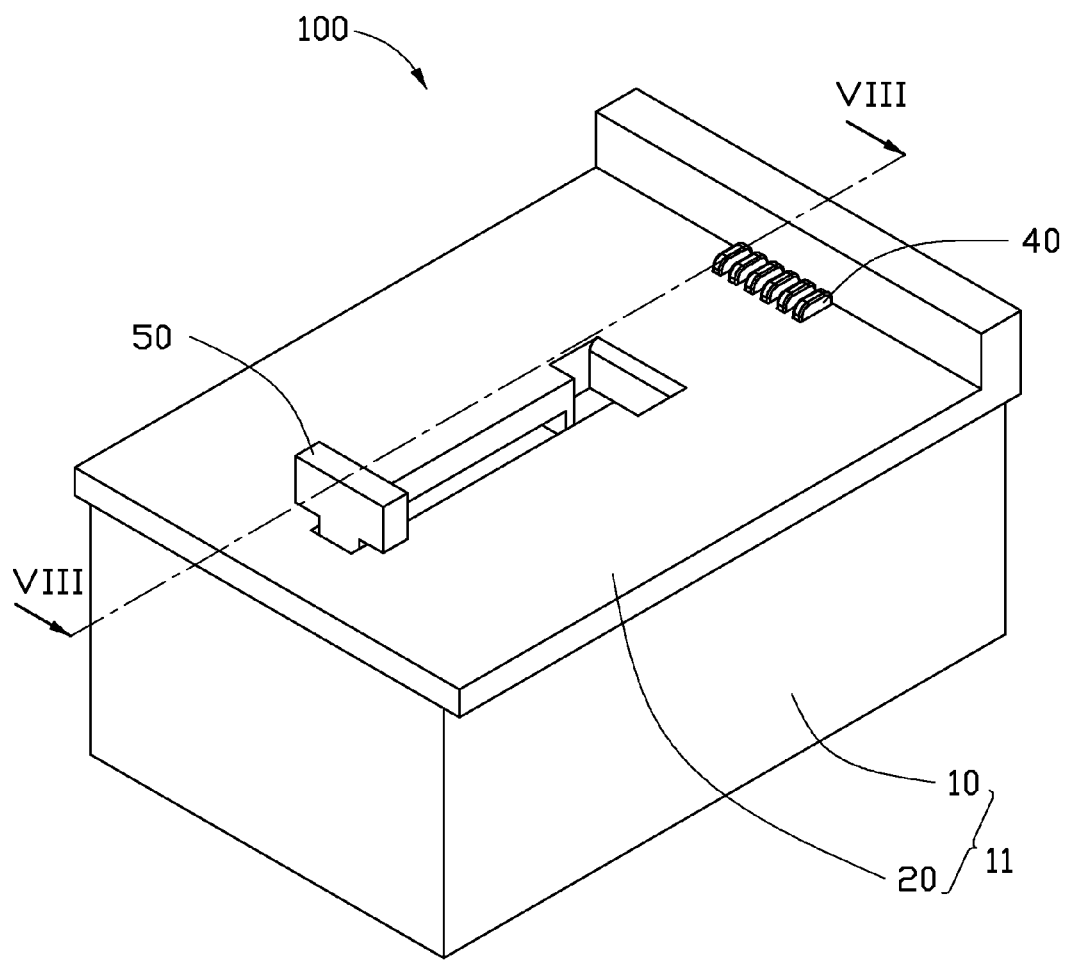
FIG. 1 is an isometric, schematic view of a battery charger in a first state according to an exemplary embodiment; the battery charger includes a housing.

Referring to FIG. 1, a battery charger 100 according to an exemplary embodiment is illustrated. The battery charger 100 is used for charging a battery 200 (see FIG. 9). In this embodiment, the battery 200 is used for a cell phone. In other embodiments, the battery charger 100 may be used for charging a battery of other electronic device such as a digital camera.

Figure 2:
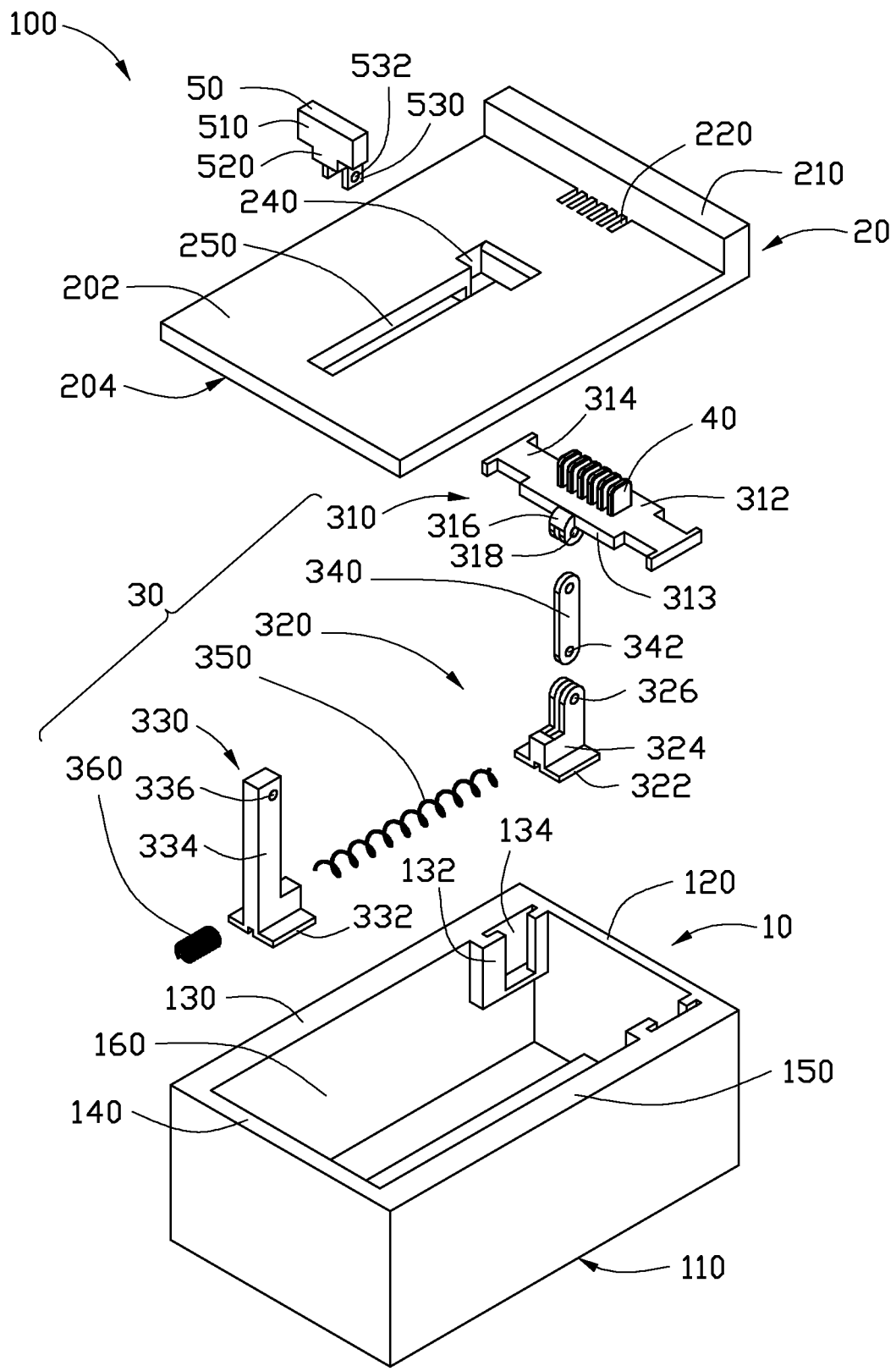
FIG. 2 is an exploded view of the battery charger of FIG. 1 from one direction.
Figure 3:
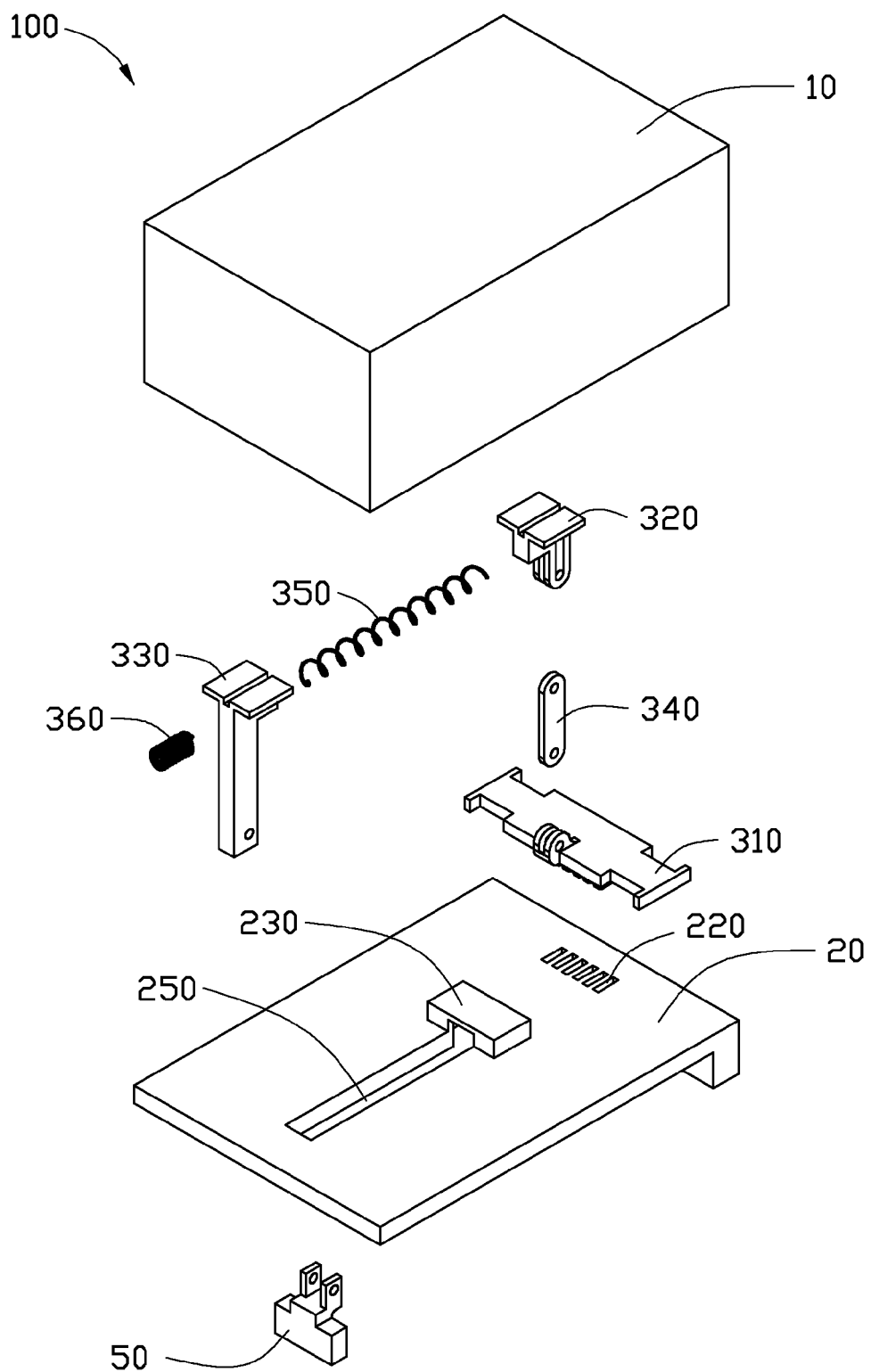
FIG. 3 is similar to FIG. 2, but viewed from another aspect.

Referring further to FIGS. 2-3, the battery charger 100 includes a housing 11 (see FIG. 1), a transmission mechanism 30, contacts 40, and a driving member 50. The housing 11 is used for receiving the driving member 50, the contacts 40, and the transmission mechanism 30. The driving member 50 is used for driving the transmission mechanism 30 to drive the contacts 40 to protrude out of the housing 11.

The housing 11 includes a main body 10 and a cover 20. The cover 20 covers on the main body 10. The main body 10 includes a rectangular bottom wall 110, and four sidewalls (hereinafter, a first sidewall 120, a second sidewall 130, a third sidewall 140, and a fourth sidewall 150) respectively protruding from the four rims of the bottom wall 110. The first sidewall 120, the second sidewall 130, and the third sidewall 140 opposite to the first sidewall 120, and the fourth sidewall 150 opposite to the second sidewall 130 are serially interconnected with each other, and cooperate with the bottom wall 110 to define an accommodating space (not labeled) to receive the transmission mechanism 30, the contacts 40, and the driving member 50.

Figure 4:
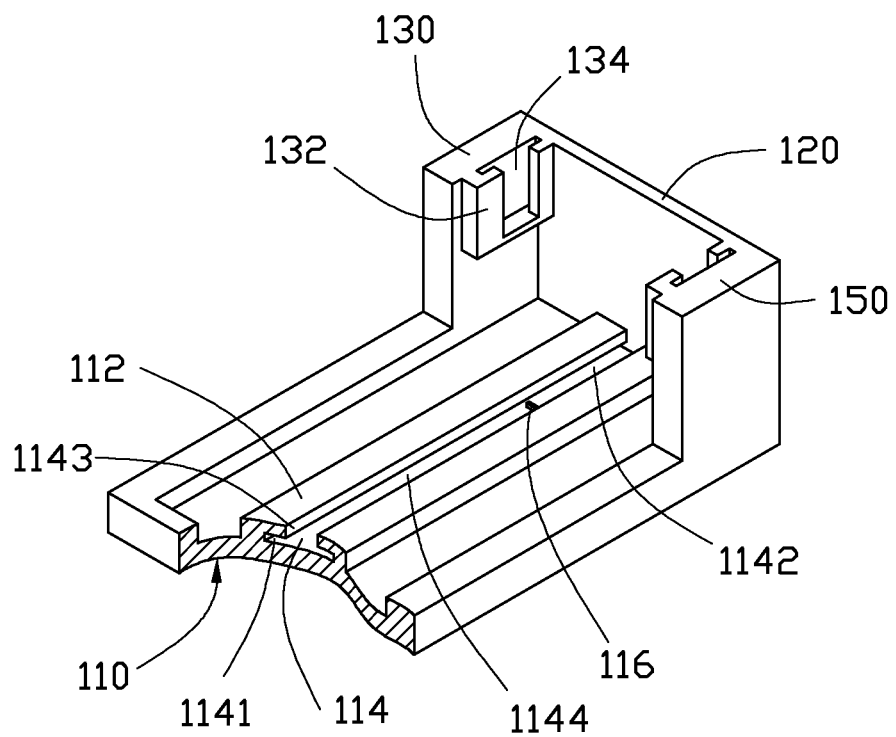
FIG. 4 is a partially perspective view of the housing of FIG. 2.

Referring to FIG. 4, a first protrusion 112 protrudes from the middle of the bottom wall 110. The first protrusion 112 is substantially perpendicular to the first sidewall 120 and the third sidewall 140, and extends from the first sidewall 120 to the third sidewall 140. The first protrusion 112 defines a first sliding slot 114. The first sliding slot 114 is substantially perpendicular to the first sidewall 120 and the third sidewall 140, and extends from the first sidewall 120 to the third sidewall 140. A cross-section of the first sliding slot 114 is substantially T-shaped. The first sliding slot 114 includes a wider portion 1141 and a narrower portion 1143 between the wider portion 1141 and the cover 20. The wider portion 1141 communicates with the narrower portion 1143. A stopper 116 is arranged in the first sliding slot 114. The stopper 116 is near the first sidewall 120. The stopper 116 further divides the first sliding slot 114 into a first sliding portion 1142 and a second sliding portion 1144. The first sliding portion 1142 is adjacent to the first sidewall 120, and the second sliding portion 1144 is adjacent to the third sidewall 140.

Two second protrusions 132 protrude respectively from the inner surfaces of the second sidewall 130 and the fourth sidewall 150. The second protrusions 132 are adjacent to the first sidewall 120. Each second protrusion 132 defines a second sliding slot 134. The shape of the second sliding slot 134 is similar to that of the first sliding slot 114. The second sliding slot 134 extends in a direction substantially perpendicular to the bottom wall 110. An end of the second sliding slot 134 near the bottom wall 110 is closed.

Referring to FIGS. 2 and 3 again, the cover 20 is substantially rectangular. The cover 20 includes an outer surface 202 and an inner surface 204 opposite to the outer surface 202. A protruding block 210 upwardly protrudes from a rim of the outer surface 202 corresponding to the first sidewall 120 of the main body 10. The protruding block 210 is perpendicular to the cover 20. The cover 20 defines a number of guide holes 220 for the contacts 40 protruding out of the cover 20. A third protrusion 230 downwardly protrudes from the inner surface 204. The cover 20 defines a receiving groove 240 at the outer surface 202, and a position of the receiving groove 240 is corresponding to that of the third protrusion 230. The receiving groove 240 is used for receiving the driving member 50. The cover 20 further defines a third sliding slot 250. The third sliding slot 250 is bored through the outer surface 202 and the inner surface 204, and extends from the receiving groove 240 to an end of the cover 20 opposite to the protruding block 210.

The transmission mechanism 30 includes a guide member 310, a first sliding member 320, a second sliding member 330, a connecting member 340 and a first elastic member 350. The guide member 310 and the first sliding member 320 are rotatably connected respectively to opposite ends of the connecting member 340. The first sliding member 320 and the second sliding member 330 are connected respectively to opposite ends of the first elastic member 350.

The guide member 310 includes a base block 312 and two T-shaped sliding portions 314 extending respectively out from the opposite ends of the base block 312. The two sliding portions 314 are slidably received respectively in the two second sliding slots 134, such that the guide member 310 slides along the second sliding slot 134 back and forth relative to the main body 10. The base block 312 includes opposite sides 313. A fourth protrusion 316 protrudes from one of the sides 313. The fourth protrusion 316 further defines a first through hole 318. The axis of the first through hole 318 is substantially parallel to the side ends 313.

The first sliding member 320 includes a rectangular first sliding portion 322 and an L-shaped first connecting portion 324. The first connecting portion 324 is arranged at the middle of the first sliding portion 322. The first sliding portion 322 is slidably received in the first sliding portion 1142 of the first sliding slot 114, such that the first sliding member 320 slides along the first sliding slot 114 back and forth between the stopper 116 and the first sidewall 120. An end of the first connecting portion 324 away from the first sliding portion 320 further defines a second through hole 326. The first sliding member 320 is rotatably connected to the connecting member 340 by an axis (not shown) positioned within the second through hole 326.

The shape of the second sliding member 330 is similar to that of the first sliding member 320. The second sliding member 330 includes a rectangular second sliding portion 332 and an L-shaped second connecting portion 334. The second connecting portion 334 protrudes from the middle of the second sliding portion 332. The second sliding portion 332 is slidably received in the second sliding portion 1144 of the first sliding slot 114, such that the second sliding member 330 slides along the first sliding slot 114 back and forth between the stopper 116 and the third sidewall 140. The width of the first and second sliding portion 322, 332 is slightly less than the width of the wider portion 1141 of the first sliding slot 114, and is larger than the width of the narrower portion 1143 of the first sliding slot 114. Such that the first and second sliding portion 322 and 332 are slidably received in the first sliding slot 114. An end of the second connecting portion 334 away from the second sliding portion 332 defines a third through hole 336. The driving member 50 is rotatably connected to the second sliding member 330 through the third through hole 336.

The connecting member 340 defines two fourth through holes 342. The two fourth through holes 342 are arranged at opposite ends of the connecting member 340. The connecting member 340 is rotatably coupled to the guide member 310 and the first sliding member 320 by an axis (not shown) received respectively in the two fourth through holes 342.

The first elastic member 350 is a coil spring. Opposite ends of the first elastic member 350 are connected respectively to the first connecting portion 324 and the second connecting portion 334. The first elastic member 350 is substantially parallel to the first sliding slot 114.

Furthermore, the transmission mechanism 30 further includes a second elastic member 360. Opposite ends of the second elastic member 360 are connected respectively to the third sidewall 140 and the second connecting portion 334. In the embodiment, the second elastic member 360 is also a coil spring.

The contacts 40 are arranged upon the base block 312 of the guide member 310, and are electrically connected to a circuit board (not shown). While charging the battery 200, the contacts 40 are further electrically connected to a power supply (not shown) via the circuit board to obtain voltage to supply the battery 200.

The driving member 50 is substantially T-shaped. The driving member 510 includes an operating portion 510, a third connecting portion 520 and a pivoting portion 530. The operating portion 510 is capable of being received in the receiving groove 240. The third connecting portion 520 is connected to the operating portion 510, and is slidably received in the third sliding slot 250. The pivoting portion 530 is connected to an end of the third connecting portion 520 away from the operating portion 510. An end of the pivoting portion 530 away from the third connecting portion 520 defines a fifth through hole 532. The driving member 50 is rotatably coupled to the second sliding member 330 through the fifth through hole 532.

Figure 5:
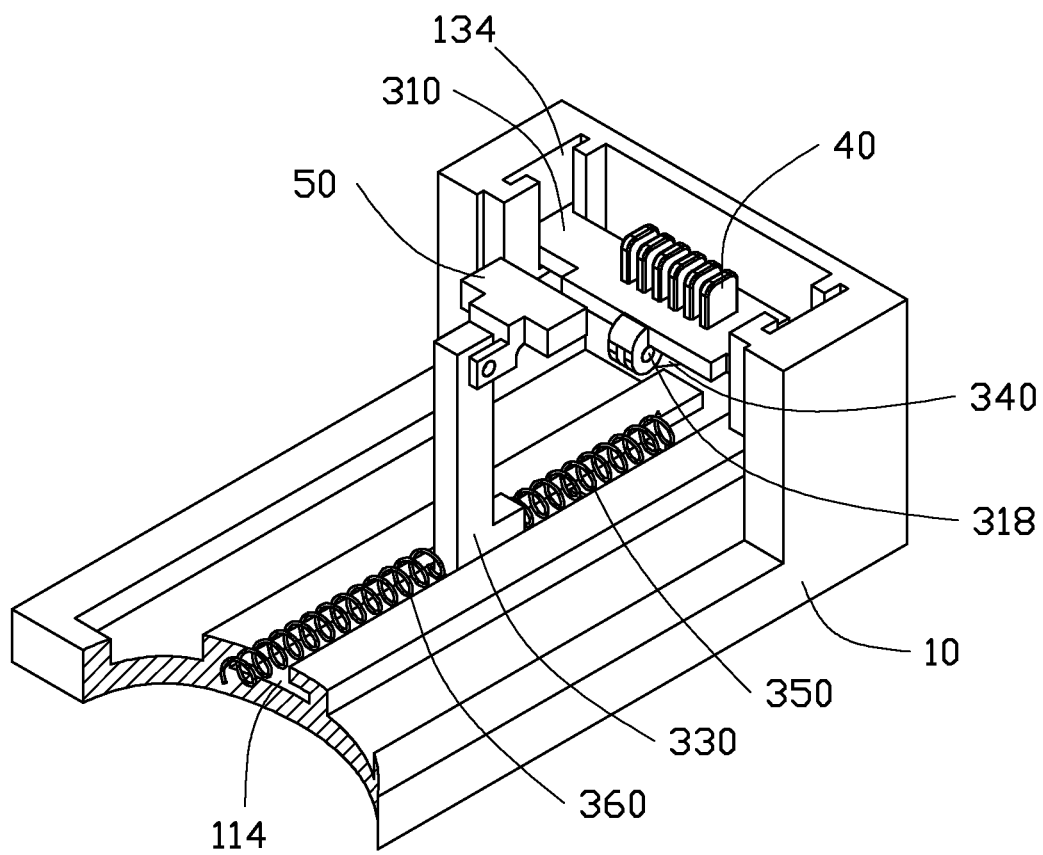
FIG. 5 is s partially assembled view of the battery charger of FIG. 2.
Figure 6:
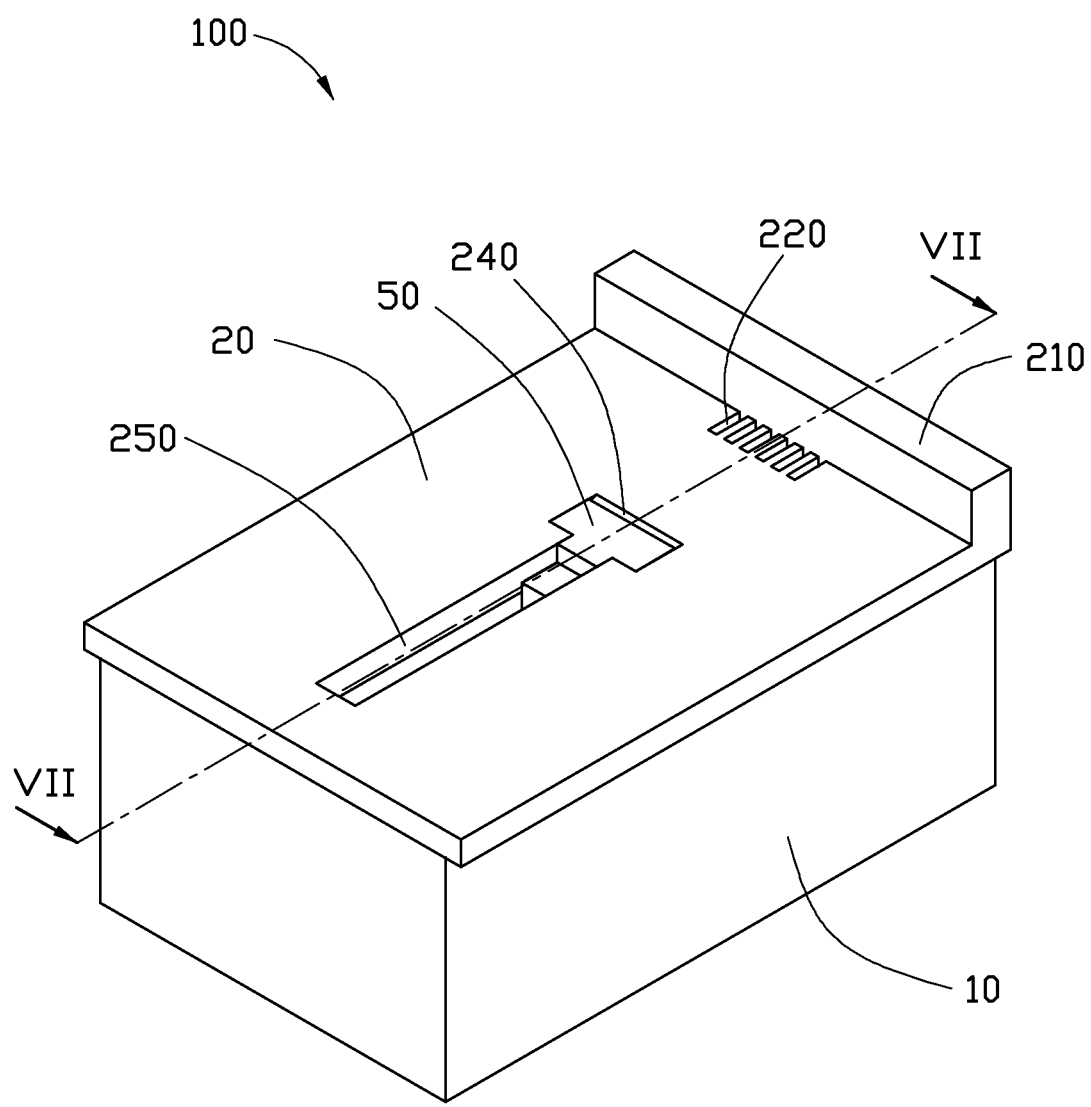
FIG. 6 is an isometric, schematic view showing the battery charger of FIG. 1 in a second state.
Figure 7:
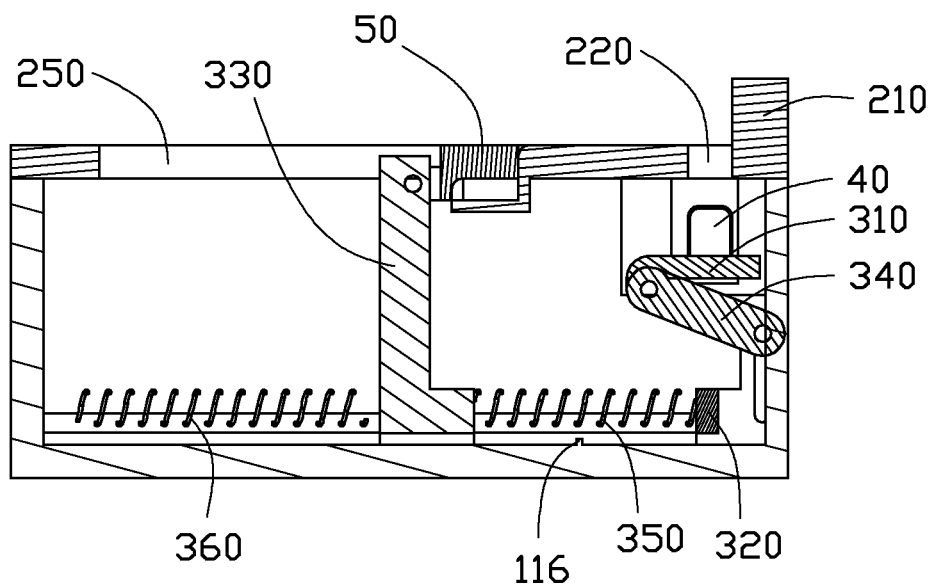
FIG. 7 is a cross-sectional view taken along line VII-VII of FIG. 6.

Referring to FIGS. 5-7, when the charger 100 is not used, the operating portion 510 of the driving member 50 is received in the receiving groove 240. The first and second elastic member 350 and 360 are in an original state, the first sliding member 320 slides against the first sidewall 120, and the guide member 310 slides to an end of the second sliding slot 134 near the bottom wall 110. In this state, the angle between the guide member 310 and the connecting member 340 is less than 90 degree, and the contacts 40 are received in the accommodating space of the housing 11.

Figure 8:
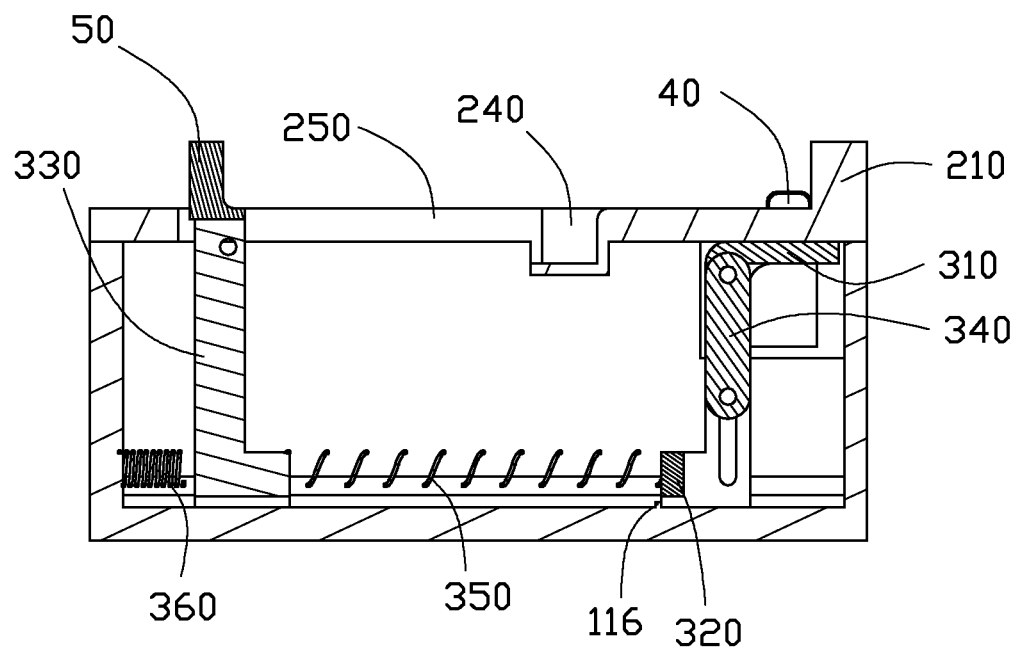
FIG. 8 is a cross-sectional view taken along line VIII-VIII of FIG. 1.

Referring to FIGS. 1 and 8, when the driving member 50 is rotated away from the receiving groove 240 to partially protrude out of the cover 20, and then pulled to slide along the third sliding slot 250. The second sliding member 330 is driven to slide toward the third sidewall 140 to press the second elastic member 360 by elastically deforming it, at the same time, the first elastic member 350 is elongated. Thus, the first sliding member 320 is driven to slide toward the stopper 116 by the distorted first elastic member 350, and the end of the connecting member 340 adjacent to the first sliding member 320 is driven to move. Because the length of the connecting member 340 is unchangeable, when the first sliding member 310 slides against the stopper 116, the connecting member 340 is substantially perpendicular to the bottom wall 110, and the guide member 310 is driven to slide along the second sliding slot 134 in a direction of away from the bottom wall 110. As a result, the contacts 40 arranged upon the guide member 310 protrude out of the number of guide holes 220 to make electrical contact with the battery 200.

Figure 9:
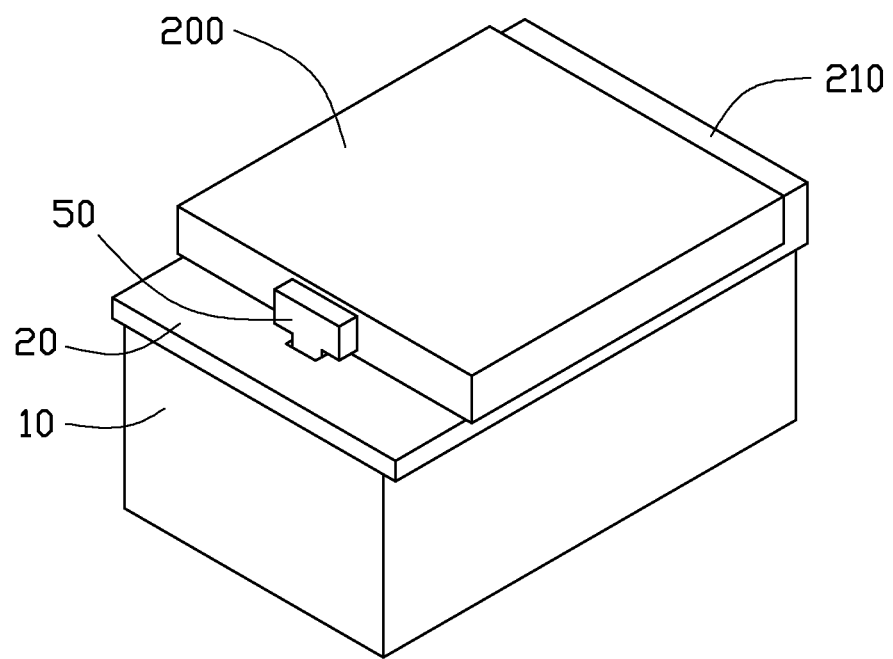
FIG. 9 is an isometric, schematic view showing the battery charger of FIG. 1 being used to charge a battery.

Referring to FIG. 9, when the contacts 40 protrude out of the number of guide holes 220, the battery 200 is sandwiched between the operating portion 510 of the driving member 50 and the protruding block 210, to be charged. Furthermore, because the first and second elastic members 350 and 360 are elastically distorted when the contacts 40 are driven to protrude out of the housing 11, the second sliding member 330 and the driving member 50 coupled to the second sliding member 330 are driven to slide toward the first sidewall 120, there is no force on the driving member 50, and the battery 200 is firmly sandwiched between the driving member 50 and the protruding block 210 when being charged.

Referring to FIGS. 5-7, when the battery 200 is removed from the battery charger 100, the elasticity of the first and second elastic member 350 and 360 drives the driving member 50, and the first and second sliding member 320 and 330 to return to an original position. The driving member 50 is capable of being rotated to be received in the receiving groove 240 again, and the contacts 40 move back into the housing 11 by passing through the corresponding guide holes 220 to be in a retracted state. Thus, the contacts 40 of the battery charger 100 in their retracted state protect them safely from being inadvertently short circuited, and the life of the battery charger 100 and the battery 200 may be extended.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A battery charger comprising:
   a housing, the housing defining a sliding slot and at least two guide holes;
   at least two contacts, the at least two contacts received in the housing and operable to protrude out of the housing via the at least two guide holes;
   a transmission mechanism, the transmission mechanism received in the housing and for driving the at least two contacts to protrude out of the housing; and
   a driving member, the driving member being received in the housing and partially extending out of the housing after passing through the sliding slot, the driving member coupled to the transmission mechanism, and the driving member capable of sliding in the sliding slot and activating the transmission mechanism to drive the at least two contacts to protrude out of the housing.

2. The battery charger of claim 1, wherein the transmission mechanism comprises a guide member, a first sliding member, a connecting member, a second sliding member, and a first elastic member, the at least two contacts are connected to the guide member, the guide member and the first sliding member are rotatably coupled to opposite ends of the connecting member, the first sliding member and the second sliding member are connected to opposite ends of the first elastic member respectively, and the second sliding member is coupled to the driving member.

3. The battery charger of claim 2, wherein when the driving member slides along the sliding slot, the second sliding member is driven to elongate the first elastic member by elastically deforming it, the first sliding member is driven by the elongated first elastic member to rotate the connecting member, and the at least two contacts connected on the guide member are driven to protrude out of the housing.

4. The battery charger of claim 3, wherein the transmission mechanism further comprises a second elastic member, opposite ends of the second elastic member are connected to the second sliding member and the housing respectively, when the driving member slides along the sliding slot, the second sliding member is also driven to press the second elastic member by elastically deforming it.

5. The battery charger of claim 4, wherein the housing comprises:
   a cover, the cover defining the sliding slot and the at least two guide holes; and
   a main body, the main body comprising a bottom wall and four sidewalls protruding from rims of the bottom wall, wherein the four sidewalls are serially interconnected with each other and cooperate with the bottom wall to define an accommodating space for receiving the transmission mechanism, the bottom wall defines a first sliding slot, at least one sidewall defines a second sliding slot, the extending direction of the first sliding slot is substantially perpendicular to that of the second sliding slot, the first sliding member and the second sliding slot are slidably received in the first sliding slot, the guide member is slidably received in the second sliding slot.

6. The battery charger of claim 5, wherein a stopper is arranged in the first sliding slot, the stopper divides the first sliding slot into a first sliding portion and a second sliding portion, the first sliding member slides in the first sliding portion, the second sliding member slides in the second sliding portion, when the first sliding member slides against the stopper, the connecting member is perpendicular to the bottom wall, and the guide member is driven to slide away from the bottom wall, whereby the at least two contacts protrude out of the at least two guide holes.

7. The battery charger of claim 5, wherein a protruding block protrudes from a rim of the cover, the protruding block is adjacent to the at least two guide holes, and the protruding block cooperates with the driving member to clip a battery.

8. The battery charger of claim 7, wherein the cover further defines a receiving groove, the receiving groove communicates with the sliding slot, and is configured to receive the driving member.

9. A battery charger comprising:
   a housing;
   at least two contacts capable of being selectively located between a first state of being inside the housing and a second state protruding out of the housing to make electrical contact with a battery;
   a transmission mechanism adapted to carry the at least two contacts, the transmission mechanism being received in the housing; and
   a driving member for driving the transmission mechanism, the driving member capable of sliding relative to the housing to selectively locate at a first position and a second position;
   wherein when the driving member locates at the first position, the at least two contacts are in the first state being inside in the housing, and the driving member is received in the housing, and when the driving member locates at the second position, the at least two contacts are in the second state protruding out of the housing to make electrical contact with the battery, and the driving member protrudes out of the housing.

10. The battery charger of claim 9, wherein the transmission mechanism comprises a guide member, a first sliding member, a connecting member, a second sliding member, and a first elastic member, the at least two contacts are connected to the guide member, the guide member and the first sliding member are rotatably coupled to opposite ends of the connecting member respectively, the first sliding member and the second sliding member are connected to opposite ends of the first elastic member respectively, and the second sliding member is coupled to the driving member.

11. The battery charger of claim 10, wherein when the driving member slides along the sliding slot, the second sliding member is driven to elongate the first elastic member by elastically deforming it, the first sliding member is driven by the elongated first elastic member to rotate the connecting member, and the at least two contacts connected on the guide member are driven to protrude out of the housing.

12. The battery charger of claim 11, wherein the transmission mechanism further comprises a second elastic member, opposite ends of the second elastic member are connected to the second sliding member and the housing respectively, when the driving member slides along the sliding slot, the second sliding member is also driven to press the second elastic member by elastically deforming it.

13. The battery charger of claim 12, wherein the housing comprises:
   a cover, the cover defining the sliding slot and the at least two guide holes; and
   a main body, the main body comprising a bottom wall and four sidewalls protruding from rims of the bottom wall, wherein the four sidewalls are serially interconnected with each other and cooperate with the bottom wall to define an accommodating space for receiving the transmission mechanism, the bottom wall defines a first sliding slot, at least one sidewall defines a second sliding slot, the extending direction of the first sliding slot is substantially perpendicular to that of the second sliding slot, the first sliding member and the second sliding slot are slidably received in the first sliding slot, the guide member is slidably received in the second sliding slot.

14. The battery charger of claim 13, wherein a stopper is arranged in the first sliding slot, the stopper divides the first sliding slot into a first sliding portion and a second sliding portion, the first sliding member slides in the first sliding portion, the second sliding member slides in the second sliding portion, when the first sliding member slides against the stopper, the connecting member is perpendicular to the bottom wall, and the guide member is driven to slide away from the bottom wall, whereby the at least two contacts protrude out of the at least two guide holes.

15. The battery charger of claim 13, wherein a protruding block protrudes from a rim of the cover, the protruding block is adjacent to the at least two guide holes, and the protruding block cooperates with the driving member to clip the battery.

16. The battery charger of claim 15, wherein the cover further defines a receiving groove, the receiving groove communicates with the sliding slot, and is configured to receive the driving member.

17. A battery charger, comprising:
a housing defining a slot and at least two guide holes;
at least two contacts received in the housing and operable to protrude out of the housing via the at least two guide holes;
a transmission mechanism, the transmission mechanism received in the housing and for driving the at least two contacts to protrude out of the housing; and
a driving member coupled to the transmission mechanism, and capable of sliding in the sliding slot and activating the transmission mechanism to drive the at least two contacts to protrude out of the housing, the driving member being capable of rotating with respect to the transmission mechanism to switch between being received in the housing and partially protruding out of the housing.

18. The battery charger of claim 17, wherein the transmission mechanism comprises a guide member, a first sliding member, a connecting member, a second sliding member, and a first elastic member, the at least two contacts are connected to the guide member, the guide member and the first sliding member are rotatably coupled to opposite ends of the connecting member respectively, the first sliding member and the second sliding member are connected to opposite ends of the first elastic member respectively, and the second sliding member is coupled to the driving member.

19. The battery charger of claim 18, wherein when the driving member slides along the sliding slot, the second sliding member is driven to elongate the first elastic member by elastically deforming it, the first sliding member is driven by the elongated first elastic member to rotate the connecting member, and the at least two contacts connected on the guide member are driven to protrude out of the housing.

* * * * *